Feb. 4, 1964  W. A. KEENE  3,120,249

APPARATUS FOR LOADING CONTAINERS

Original Filed Oct. 2, 1959  4 Sheets-Sheet 1

INVENTOR.
W.A. KEENE

ATTORNEYS

INVENTOR.
W. A. KEENE

United States Patent Office 3,120,249
Patented Feb. 4, 1964

3,120,249
APPARATUS FOR LOADING CONTAINERS
William A. Keene, Bartlesville, Okla., assignor to Phillips Petroleum Company, a corporation of Delaware
Original application Oct. 2, 1959, Ser. No. 843,974, now Patent No. 3,072,314, dated Jan. 8, 1963. Divided and this application May 14, 1962, Ser. No. 194,480
4 Claims. (Cl. 141—172)

This invention relates to relatively large containers for packing and shipping relatively large quantities of bulk commodities which are free flowing or have a tendency to cold flow. In one aspect this invention relates to palletized containers wherein the pallet is an integral part of the container. In still another aspect of the invention a palletized container for handling bulk material is provided which is expendable and can be discarded after use.

This is a division of my copending application Serial No. 843,974, filed October 2, 1959, now Patent No. 3,072,314, issued January 8, 1963.

Free-flowing bulk materials or bulk solids which have a tendency for cold flow present serious problems in handling, including shipping and storage, where contamination of the bulk materials must be prevented. Manufacturers and users of synthetic rubber are particularly concerned with the handling or synthetic rubber bales which are subject to cold flow and must be protected from contamination. The present basic package or unit of synthetic rubber is a rectangular bale weighing from about 75 to about 90 pounds, approximately 28 inches long, 14 inches wide, and 6 to 7 inches thick. This unit was developed at the time the GR–S (government rubber-styrene, synthetic rubber made in U.S. Government plants in 1943 and following years) plants were designed and is now accepted as a "standard." Shipments of natural rubber are now being received in this country in the form of such bales. It has been proposed to use rigid containers for the shipment of a plurality of these bales after which the container is knocked down and returned to the supplier for reuse. Reusable containers present the problem of returning the empty containers from the user to the supplier with the attendant transportation costs. It has also been proposed to fabricate containers from materials such as a multithickness of corrugated paperboard so that the container is expendable and transportation costs of returning the containers are avoided. The expendable containers of the prior art have not provided adequate protection for the rubber bales and contamination of the rubber bales has offset the advantage gained by using expendable containers. It is essential that the containers used for shipment of rubber bales be quickly and easily removed by the user of the rubber.

It is an object of this invention to provide a substantially rigid, and at the same time expendable, container for handling bulk material. It is a further object of this invention to provide a container for bulk material which has a pallet as an integral part thereof to support the material in the container and to facilitate handling of the container. It is a further object of this invention to provide a container having a floating pallet tray therein to facilitate filling the container with bulk material. A further object of this invention is the provision of a loading device for lowering the pallet tray in the container as the bulk material is added to the container so that the filling is accomplished at a substantially constant level. Other and further objects and advantages will be readily appreciated by one skilled in the art upon study of this disclosure, including the detailed description of the invention and the appended drawing wherein:

In describing the containers and loading equipment of this invention, containers for transportation and storage of rubber bales will be considered, although the shape and size of the containers can be altered to accommodate materials other than rubber bales. The inside dimensions of containers for handling rubber bales are about 28¼ inches by 42½ inches and the height is usually about 66 inches but can vary considerably. The pallet base, which is an integral part of the containers of FIGURES 1 and 4, supports the container a few inches off the floor so that loading equipment, such as a fork truck, can lift the container from any side. The rigid construction of the containers makes possible the stacking of the filled containers in a warehouse to conserve space.

The materials of construction used for fabrication of the containers of this invention will be dictated by the end use of the container. For fabrication of containers for use in the handling of rubber bales, pressed wood boards or wood core-paper laminates are preferred where-in the wood core is from about 1/16 to about ⅛ inch in thickness and the paper is a heavy craft type paper. For materials of less bulk density than rubber, corrugated paperboard will usually be satisfactory.

Figure 1:
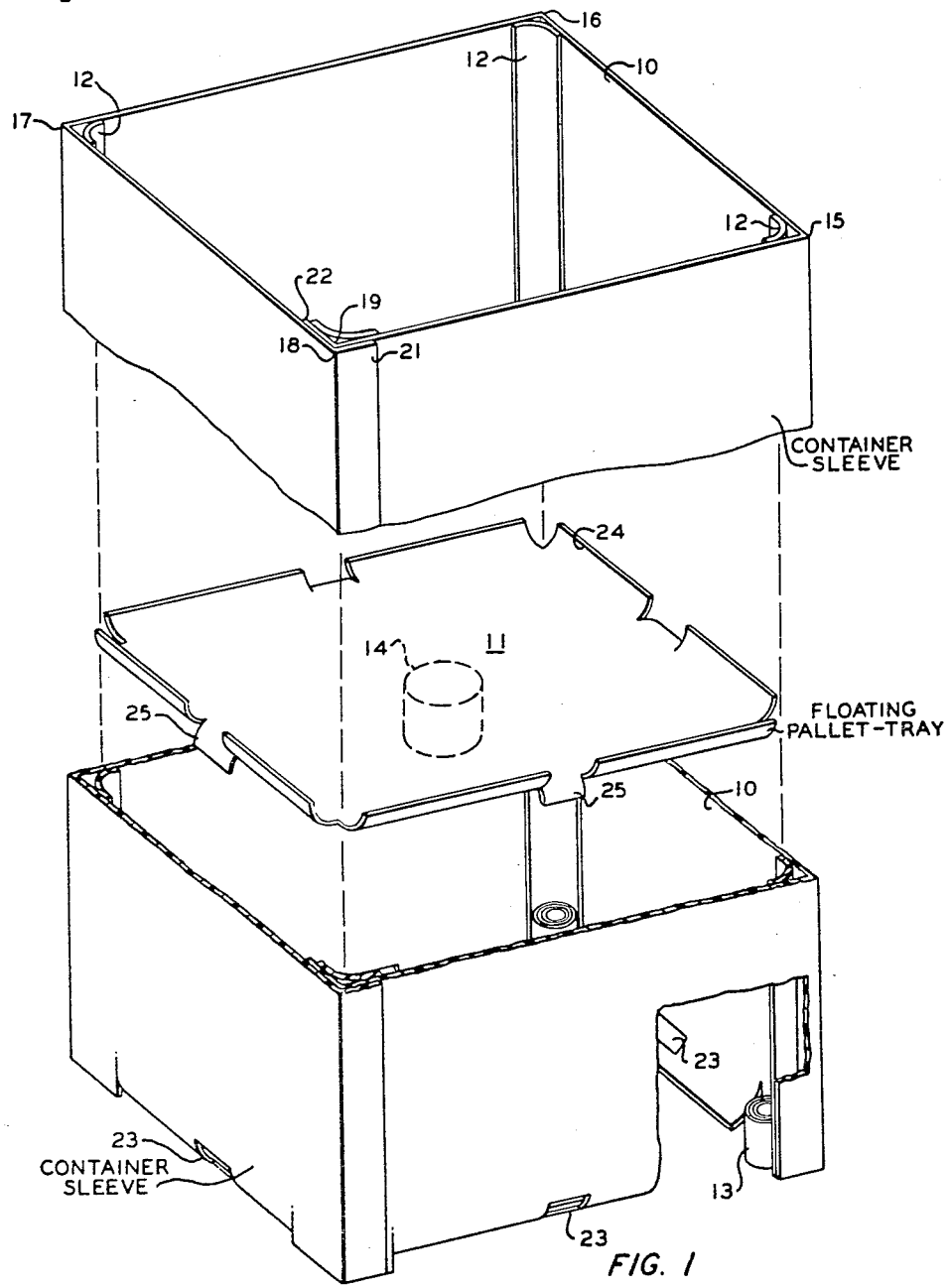
FIGURE 1 is a perspective view, partly in section, of a preferred embodiment of the container of this invention.

Referring now to the drawing, and particularly to FIGURE 1, a container is illustrated comprising container sleeve 10, floating pallet tray 11, corner fillets 12, corner pallet posts 13 and center pallet post 14. The container sleeve 10 is scored vertically so as to have V routs or kerfs, indicated at 15, 16, 17, 18 and 19 so that the container sleeve will lie flat for shipment and can be readily formed into the rectangular tube as illustrated with the V kerfs indicated at 15 in FIGURE 2 on the inside of the container. The overlapping portions 21 and 22 are secured by suitable means such as gluing, stapling, riveting, and the like. The pallet posts 13 are formed by rolling the laminate or hardboard and cutting the roll into segments. These pallet posts are secured to the fillets 12 by gluing, stapling and the like and the fillets with the pallet posts attached are secured in the corners of the rectangular tube by gluing, stapling and the like. The fillets 12 are molded or otherwise formed as curved strips of hardboard or wood core laminate.

The bottom ends of the container sleeve sides between the fillets 12 and pallet posts 13 are curved inwardly to provide vertical support for floating pallet tray 11 and to provide clearance for insertion of lifting equipment between the floating pallet tray 11 when in its lowermost position, and the floor upon which the container rests. Openings 23 are provided in the inwardly curved portions of the bottom edges of the container sleeve 10 to receive the locking tabs 25 of the floating pallet 11. The floating pallet 11 has a center pallet post 14 secured to the bottom thereof for support and the outer edges of the pallet are curved upward by molding or other operation to conform to the inwardly curving sides of the container sleeve 10. A segment of each side of the floating pallet tray 11 is curved downwardly as indicated at 25 so as to pass through the openings 23 of the container sleeve so as to stabilize the pallet tray in the bottom of the container.

Figure 2:
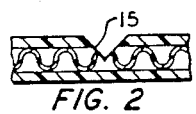
FIGURE 2 is a detail of the vertical wall of the container sleeve of FIGURE 1.

FIGURE 2 shows a detail of the groove or kerf 15 of the container sleeve 10. Grooves 15, 16, 17, 18 and 19 are identical.

Figure 3:
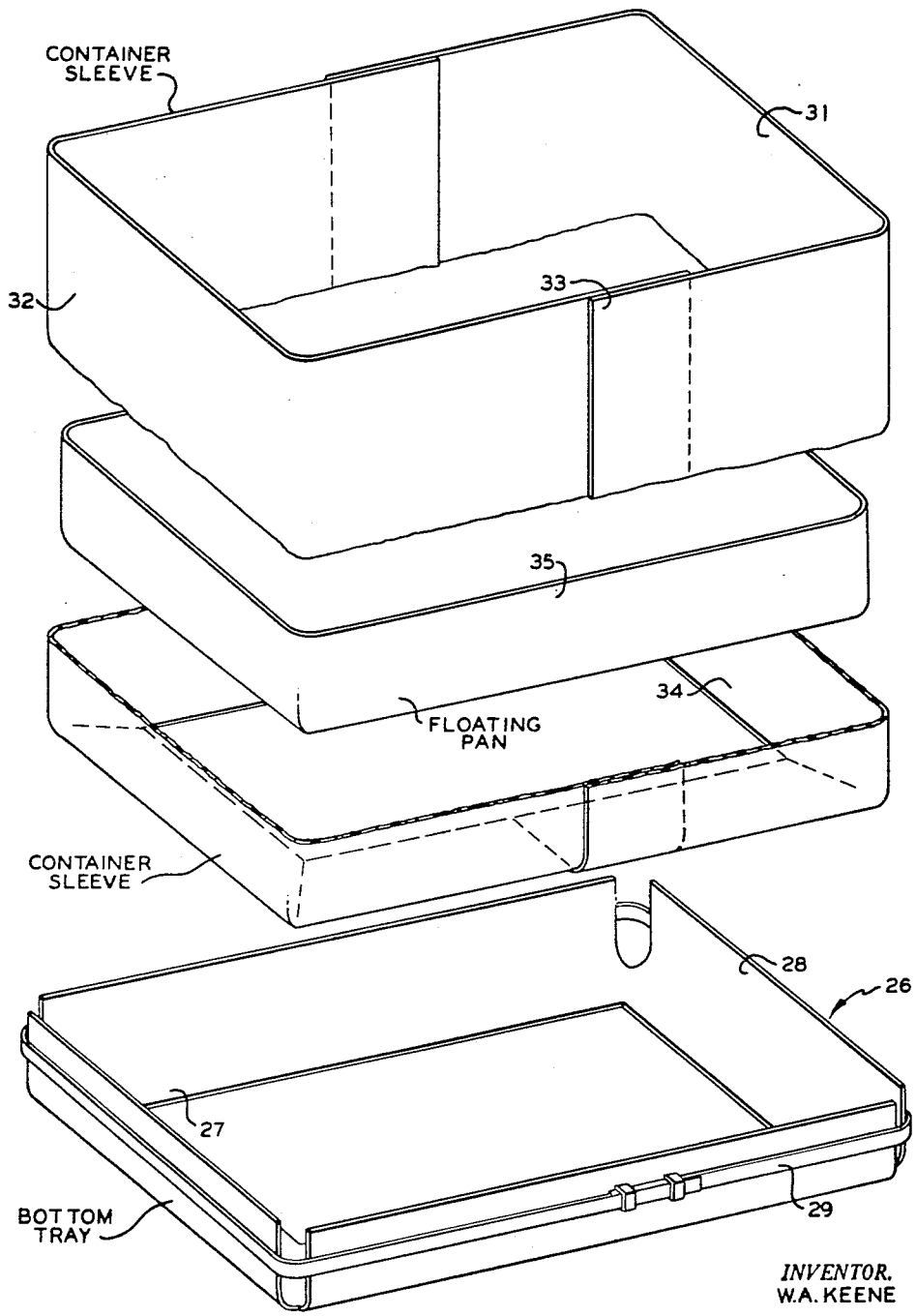
FIGURE 3 illustrates a modification of the container of this invention.

A modified form of container is shown in FIGURE 3. The bottom tray 26 is utilized instead of a pallet and is comprised of sides 28 and open bottom portion 27 wherein the sides are held in place and reinforced by metal strap 29. The bottom tray serves to protect the bottom of the container and facilitates insertion of lifting equipment such as the forks of a fork truck between the container and floor on which the container is resting.

The sides 31 and 32 of the container can be, and preferably are, constructed substantially identical so as to be lapped as indicated at 33 and secured by gluing, stapling and the like to make a rectangular sleeve or tube with the bottom edge 34 formed by molding to conform to the bottom tray 26. The floating pan 35 forms the bottom of the container and its outside dimensions are just smaller than the inside dimensions of the container so as to be vertically movable within the container sleeve.

Figure 4:
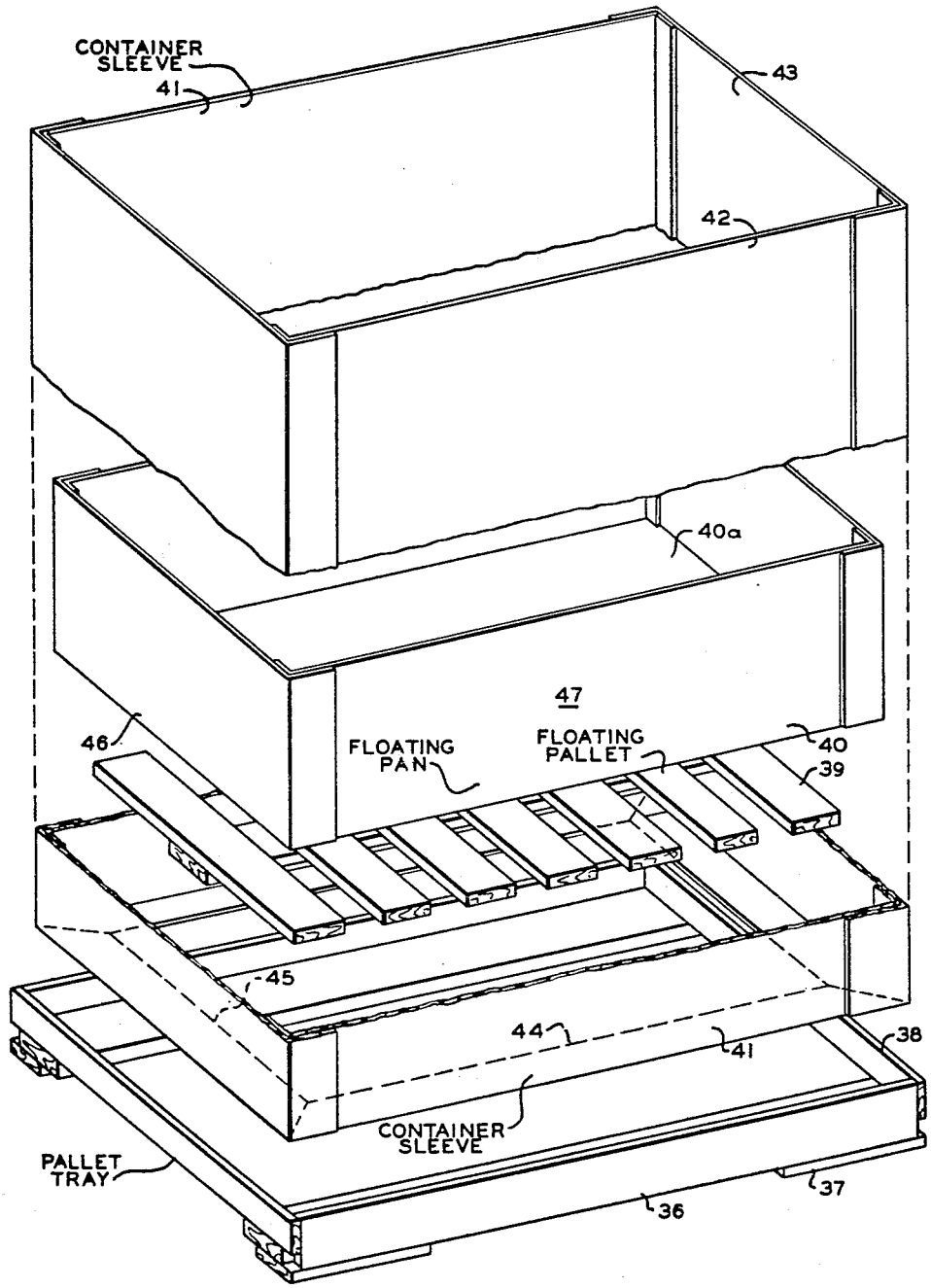
FIGURE 4 illustrates another modification of the container of this invention.

Another modification of the container of this invention is shown in FIGURE 4 comprised of wood pallet tray 36 supported on blocks 37 having sides 38 to provide structural strength to the bottom of the container, floating wood pallet 39, floating pan 40 and container sleeve 41. The container sleeve 41 is shown as composed of two identical sides 42 and two identical sides 43 which are grooved as in the container of FIGURE 1 to form the laps at the corners which are secured together by gluing, stapling and the like to form a continuous rectangular sleeve or tube. If desired, the container sleeve 41 can be made in one piece or two pieces in accordance with regular procedures in the paper box industry. Laps indicated at 44 and 45 on the bottom ends of the side sections are folded inwardly upon assembly of the tube so as to rest on the pallet tray 36 and the floating pallet 39 in turn rests upon these flaps to secure the container sleeve in position. Floating pan 40 has a solid portion 40a with raised sides 46 and 47 and can be cut from one piece of material such as double faced corrugated paperboard and formed into a shape such as that indicated when the container is assembled. The corners need not be lapped as indicated but if lapped can be secured in position if desired by gluing, stapling and the like. The floating pan rests upon the floating pallet in the container and provides an impervious bottom portion for the container to furnish a continuous support for the contents and exclude contaminants.

Figure 5:
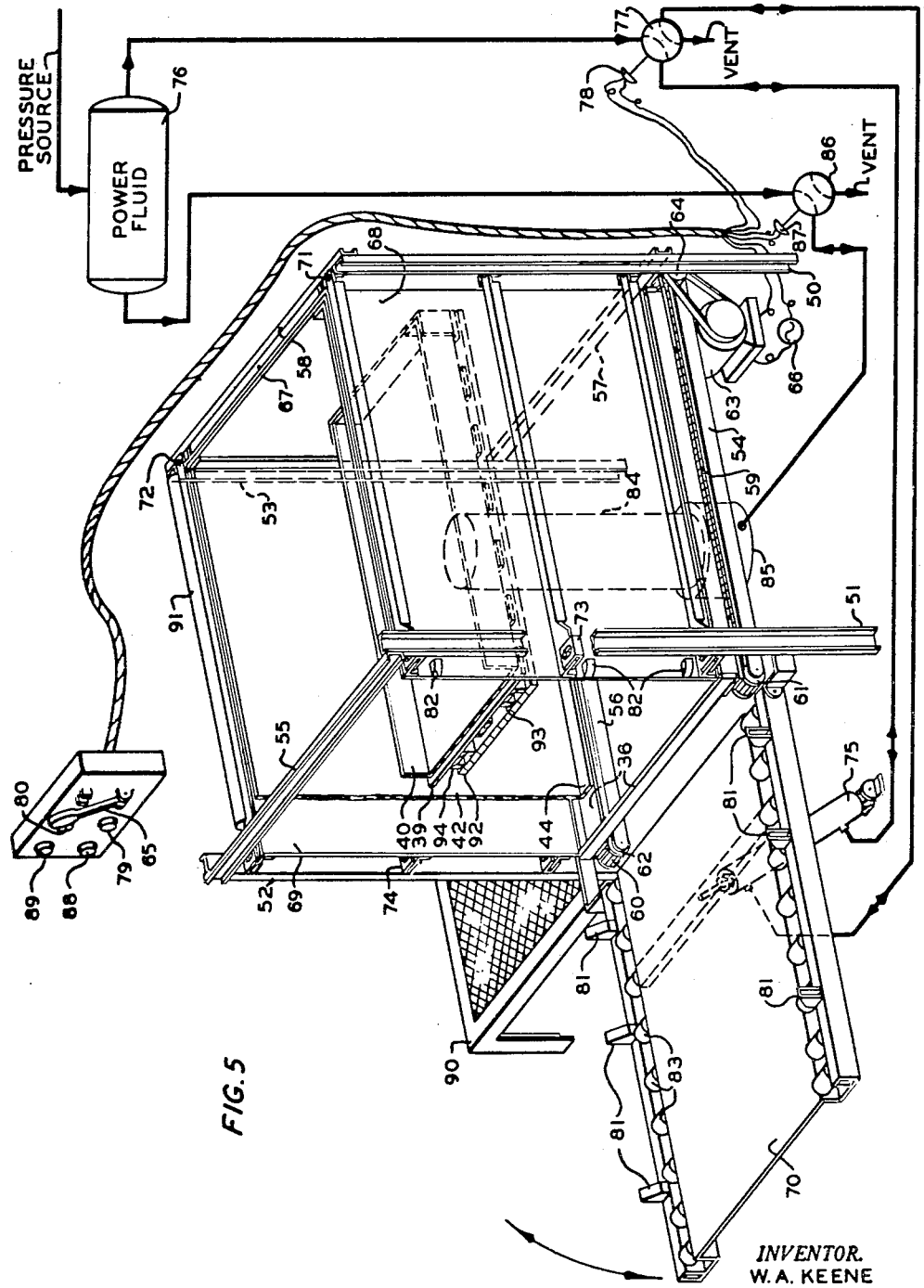
FIGURE 5 is a view, partly in section, of the device for filling the containers of this invention.

FIGURE 5 is a perspective view, partly in section, of the packaging device of this invention and comprises a frame composed of rigid vertical members 50, 51, 52 and 53. Horizontal support members 54, 55, 56 and 57 provide rigidity to the frame structure. Support members 54 and 56 support endless chains 59 and 60 which travel on cog wheels indicated at 61 and 62, respectively. Motor 63 is connected to pulley 64, which in turn is connected to a cog wheel actuating endless chain 59, so as to rotate the endless chain 59 counterclockwise around the cog wheel 61 when switch 65 is closed to connect motor 63 to power source 66. The structure is enclosed on four sides by panels 67, 68, 69 and door 70. Side panels 68 and 69 are pivoted at 71 and 72, respectively, so that the opposite ends are free to move horizontally in the slot and bar elements indicated at 73 and 74, respectively.

Door 70 is raised into closed position and lowered to open position by means of hydraulic cylinder and piston 75 connected to power fluid reservoir 76 by means of two-position, four-port valve 77 actuated through solenoid 78 by switches 79 and 80. Upon raising door 70 to closed position, the wedges 81 on door 70 bear against the dogs, or companion wedges 82 on the side panels 68 and 69 so as to force these panels inwardly. Rollers indicated at 83 on door 70 are free running and raised slightly above the surface of the door to facilitate moving a loaded carton over the surface of the door 70 when in down position.

Elevator piston 84, positioned in cylinder 85, is actuated by compressed air or hydraulic fluid, or a combination of the two, from reservoir 76 through two-position, three-way valve 86 by means of solenoid 87 by operation of switches 88 and 89, respectively. In order that piston 84 may properly support the contents of the container, a superstructure comprising a rectangular metal plate 92, supporting channel irons 93 and 94, is positioned on top of the piston.

The operator stands on platform 90. Roller 91 facilitates the passage of rubber bales from the supplying conveyor (not shown).

The operation of the packaging device will be explained with specific reference to the container shown in FIGURE 4. The operation is started with the elevator piston 84 in down position and the door 70 open. The pallet tray 36 and the floating pallet 39 are placed in the device so that the pallet tray rests upon the endless chains. The elevator piston is then raised about four or five inches so as to raise the floating pallet from the pallet tray and the assembled container sleeve is then placed in the packaging device with the bottom flaps 44 and 45 turned inwardly so as to rest upon the pallet tray. The door 70 is closed by operating switch 79 and the elevator piston 84 is raised to top position. The floating pan 40 is then inserted from the top and placed firmly on the floating pallet 39. The loading of the container is now commenced by rolling bales across roller 91 and placing them in the floating pan 40. As each layer of bales is added to the container, the elevator piston 84, is lowered so that additional bales can be placed in the container and this operation is repeated until the container is filled.

At the conclusion of filling the container with bales of rubber, the door 70 is lowered into down position, which can be inclined downwardly, thus releasing the sides 68 and 69 after which the motor 63 is started and the loaded container is rolled out onto and across door 70 to a receiving means such as a conveyor belt or loading platform from whence it can be removed by a fork truck or other container handling equipment.

The packaging apparatus enables the operator to fill a container with bulk materials such as bales of rubber without stooping or lifting and without dropping the bales into the container because the conveyor delivers the bales to the top of the apparatus and the level of the bales in the container remains constant during the filling operation as a result of lowering the bottom of the container as the container is filled.

Reasonable variations and modifications are possible within the scope of this disclosure without departing from the spirit and scope of the invention.

That which is claimed is:

1. Apparatus for flowing bulk material to a container having a bottom portion slidably positioned within said container comprising a frame structure composed of four vertical side panel members to confine said container on its four vertical sides, one of said panels being hinged at the bottom so as to form a door which is substantially level with the bottom of the container when in open position; means to raise the bottom of said container to the top thereof and to lower said bottom member as said container is being filled; means to lower said door to open position when said container is filled; and means to remove said filled container from said apparatus.

2. The apparatus of claim 1 wherein the sides of the apparatus adjacent the open door are movable outwardly to release said filled container.

3. Apparatus for filling a container having a vertically displaceable bottom portion comprising a substantially rectangular frame composed of vertical and horizontal support members; an impermeable back panel rigidly secured to said support members; an impermeable front panel hinged at the bottom so as to be lowered to a position substantially level with the bottom of said apparatus; a pair of side panels secured to said support members; a pair of endless tracks adjacent the sides of said apparatus and substantially level with said front panel when in a lowered position; means to operate said endless tracks; means to lower and to raise said front panel; and means to raise the bottom portion of a container placed in said apparatus to the top thereof and to lower said bottom portion to the bottom thereof.

4. The apparatus of claim 3 wherein the side panels of said apparatus are pivoted at the back side thereof so as to allow the sides to swing outwardly to release a filled container.

References Cited in the file of this patent

UNITED STATES PATENTS

| | | |
|---|---|---|
| 386,649 | Mitchell | July 24, 1888 |
| 766,433 | Von Echt | Aug. 2, 1904 |
| 822,310 | Scott | June 5, 1906 |
| 2,608,335 | Rohdin | Aug. 26, 1952 |
| 2,976,653 | Peterson | Mar. 28, 1961 |